United States Patent [19]

Kueppers

[11] Patent Number: 4,812,899
[45] Date of Patent: Mar. 14, 1989

[54] PRINTING PROCESS WHERE EACH INCREMENTAL AREA IS DIVIDED INTO A CHROMATIC AREA AND AN ACHROMATIC AREA AND WHEREIN THE ACHROMATIC AREAS ARE PRINTED IN BLACK AND WHITE AND THE CHROMATIC AREAS ARE PRINTED IN COLOR SUB-SECTIONS

[76] Inventor: Harald Kueppers, Im Buchenhain 1, D-6070 Langen, Fed. Rep. of Germany

[21] Appl. No.: 943,435

[22] Filed: Dec. 19, 1986

Related U.S. Application Data

[63] Continuation of Ser. No. 703,227, Jan. 29, 1985, abandoned.

[51] Int. Cl.$^4$ .................................................. H04N 1/46
[52] U.S. Cl. ............................................. 358/75; 358/78
[58] Field of Search ............................ 358/75, 78, 298

[56] References Cited

U.S. PATENT DOCUMENTS

| | | | |
|---|---|---|---|
| 3,247,816 | 4/1966 | Polevitzky | 358/78 |
| 4,052,715 | 10/1977 | Streifer | 358/298 |
| 4,630,076 | 12/1986 | Yoshimura | 358/75 |

FOREIGN PATENT DOCUMENTS

| | | |
|---|---|---|
| 1771422 | 8/1972 | Fed. Rep. of Germany . |
| 2307374 | 8/1974 | Fed. Rep. of Germany . |
| 1001433 | 8/1965 | United Kingdom . |
| 2106741 | 4/1983 | United Kingdom . |

*Primary Examiner*—James J. Groody
*Assistant Examiner*—Robert M. Bauer

[57] ABSTRACT

A method for producing multi-color prints with the color impressions produced by a plurality of inked elemental surfaces and the picture surface is divided into subsurfaces of identical size and every subsurface is divided into juxtaposed elemental surfaces which form a chromatic component and an achromatic component so that the color nuance desired at the particular picture location is obtained, whereby the elemental surfaces which form the chromatic component are printed with a maximum of two of six chromatic printing inks, yellow, orange-red, magenta-red, violet-blue, cyan blue, green and black, depending on the chromatic component to be produced, and the elemental surfaces which produce the achromatic component are a mixture of white and black depending on the achromatic component of the sub-surface to be produced.

9 Claims, 5 Drawing Sheets

|   | V | G | O |
|---|---|---|---|
| W | x | x | x |
| Y | - | x | x |
| M | x | - | x |
| C | x | x | - |
| V | x | - | - |
| G | - | x | - |
| O | - | - | x |
| S | - | - | - |

*Fig. 1*

| 3/3 | W | W | W | W | W | W |
|---|---|---|---|---|---|---|
| 2/3 | Y | C | C | M | M | Y |
| 1/3 | G | G | V | V | O | O |
| 0 | S | S | S | S | S | S |

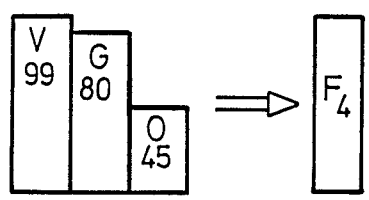
Fig. 4a
| V | G | O | |
|---|---|---|---|
| 99 | 80 | 45 | |
| 45 | 45 | 45 | W 45 |
| 35 | 35 | 00 | C 35 |
| 19 | 00 | 00 | V 19 |
Fig. 4b
Fig. 4c
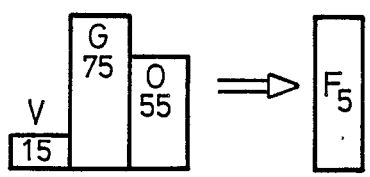
Fig. 5a
| V | G | O | |
|---|---|---|---|
| 15 | 75 | 55 | |
| 15 | 15 | 15 | W 15 |
| 00 | 40 | 40 | Y 40 |
| 00 | 20 | 00 | G 20 |
| 00 | 00 | 00 | S 25 |
Fig. 5b
Fig. 5c Fig. 6
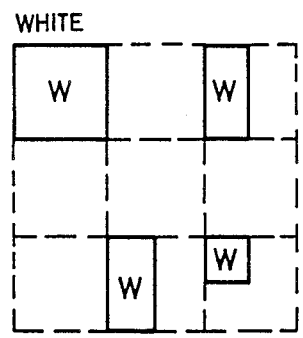
Fig. 6a
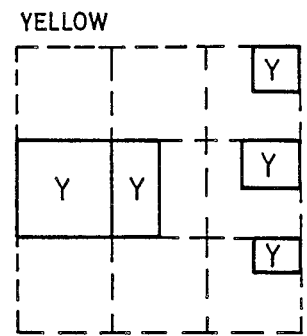
Fig. 6b
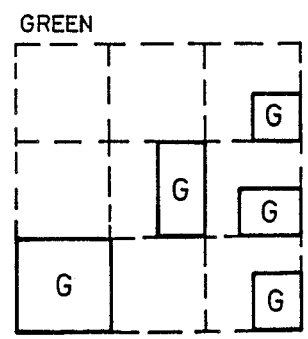
Fig. 6c
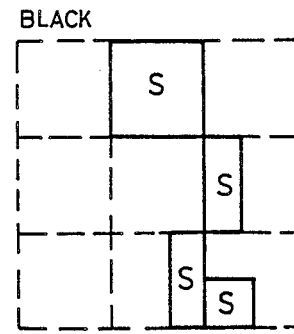
Fig. 6d

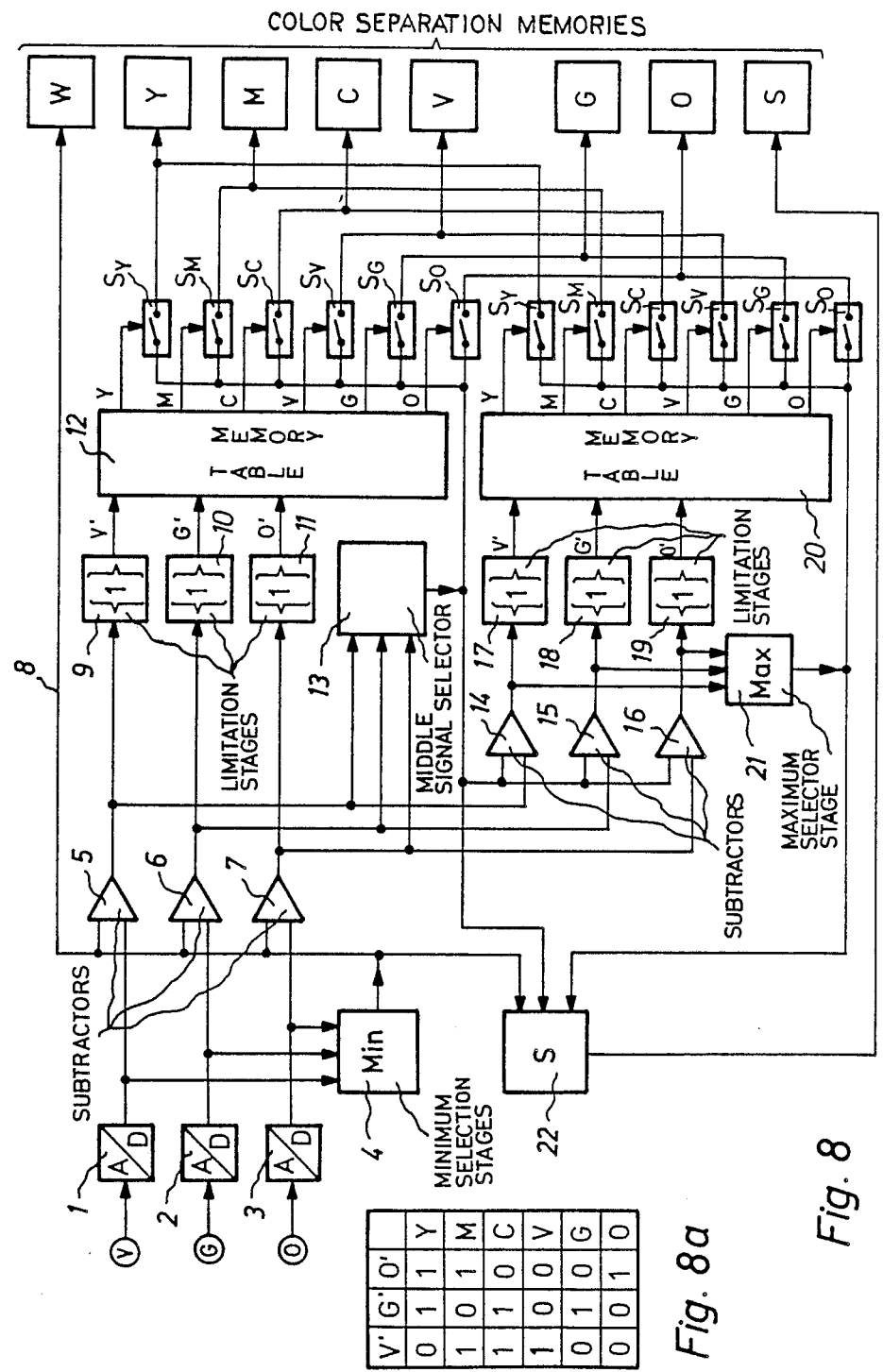

PRINTING PROCESS WHERE EACH INCREMENTAL AREA IS DIVIDED INTO A CHROMATIC AREA AND AN ACHROMATIC AREA AND WHEREIN THE ACHROMATIC AREAS ARE PRINTED IN BLACK AND WHITE AND THE CHROMATIC AREAS ARE PRINTED IN COLOR SUB-SECTIONS

This is a continuation of application Ser. No. 703,227, filed Jan. 29, 1985.

BACKGROUND OF THE INVENTION

1. Technical Field

The present invention relates to a reproduction method for producing multi-color printings, whereby the chromatic impression arises by means of a multitude of inked surface elements.

2. Description of the Prior Art

It is known in printing technology to produce multi-color printing with the assistance of color separations, whereby one color separation is produced for every printing ink and the reproduction is produced by means of superimposed printing of the sub-images established by the color separations. Usually, three chromatic printing inks, magenta (M), cyan (C) and yellow (Y), are employed or, respectively, the color black (S) in addition given four-color printing. This printing process is based, on the one hand, on the law of subtractive mixing and, on the other hand, on the law of optical mixing (additive mixing). As a result of the law of subtractive mixing, the secondary and tertiary colors of the various elemntal surfaces arise due to superimposed printing of glazing ink layers, whereby elemental surfaces are formed in the colors yellow, magneta-red, cyan blue, orange-red, green, violet-blue and black. The elemental surfaces in white arise by means of the paper locations not covered with printing ink. The secondary colors orange-red, green and violet-blue arise by means of superimposed printing of respectively two glazing, chromatic ink layers. Elemental surfaces in black arise by means of superimposed printing of the three chromatic ink layers. Elemental surfaces in black are added by means of the ink black.

The production of such color separations ensues by means of so-called scanners, whereby the German Letters Patent No. 21 07 738 which corresponds to U.S. Pat. No. 3,725,524, is referenced. Such apparatus have been in commercial use for some time, thus, for example, the scanner type DC 300 or the scanner Chromagraph CTX 330 of Dr.-Ing. Rudolf Hell GmbH, Kiel. The scanner Chromagraph CTX 330 is described in the publication No. 1483 (T-ld-8201) of Dr.-Ing. Rudolf Hell GmbH, Kiel, dated January 1982. which corresponds to US Edition. The versatile chromagraph CTX 330, which is available in the US from HCM Corp. Cutter Mill road; Great Neck, N.Y. 10021. Such scanners function, for example, with a laser writing unit for generating the raster points, whereby the raster point configurations are stored and the laser writing unit is controlled during recording with the assistance of these stored data.

The German OS No. 32 03 972 which corresponds to U.S. Pat. No. 4,412,225 and the German OS No. 30 37 774 which corresponds to U.S. Pat. No. 4,367,481 also specify a method for the representation of multi-color images wherein an ink application by means of an ink jet ensues such that individual elemental surfaces are inked in that ink drops are deposited in a matrix with the printing inks M,G,C,Y. Additive mixing (optical mixing) is thereby likewise employed given low tint values and subtractive mixing is employed given high tint values.

These printing methods are very widespread but are burdened with disadvantages; thus, for example, color acceptance problems occur when printing, moiré appears when the screen angle is not exactly observed, and pure and luminous colors cannot be reproduced well.

SUMMARY OF THE INVENTION the present invention is therefore based on the object of specifying a new reproduction method for the production of multi-color printings which is completely unsusceptible to moiré and with which an improved color reproduction is enabled. The invention achieves this by means of the features recited in the characterizing part of claim 1. Advantageous further developments of the invention are described in sub-claims 2 through 7. The inventive method is distinguished in that seven or, respectively, eight printing inks are used and the printing elements lie side-by-side, whereby the surface of a printed, multi-color image is divided into geometrical sub-surfaces of identical size, for example squares, rectangles, equilateral triangles, hexagons or rhombi, and whereby the size of the individual sub-surfaces is selected such that they lie below the resolution threshold of the human eye at the respective observation distance so that the individual sub-surfaces are not individually perceived. Seven printing inks, namely yellow, orange-red, magenta-red, violet-blue, cyan blue, green and black, are used when printing is carried out on white or transparent printing material and, when printing is carried out on printing materials having an arbitrary color, then white is printed by the eighth printing ink, white.

The individual geometrical sub-surfaces are filled out by means of a maximum of four elemental surfaces lying side-by-side. When four elemental surfaces are present in a sub-surface, then it is a matter of elemental surfaces having the colors white and black, on the one hand, and, on the other hand, of elemental surfaces of two neighboring chromatic printing inks (printing inks lying side-by-side).

In this printing method, the chromatic component of a color nuance (picture location) arises by means of two of the six said neighboring chromatic printing inks. The chromatic component can thus arise by means of the chromatic printing inks yellow and orange-red or orange-red and magenta-red or magenta-red and violet-blue or violet-blue and cyan blue or cyan blue and green or green and yellow. The achromatic component of a color nuance (picture location) always arises by means of the colors black and white, whether the elemental surface of white arises in that unprinted printing material remains effective or that white elemental surfaces are printed on the printing material by means of the printing ink white.

Given application of the method on white or on transparent printing stock, work can be optionally executed with glazing (i.e. transparent) colors or with covering (opaque) printing inks. Given a printing stock having a different pigmentation, the white printing ink is fundamentally added as a covering color. When printing on a printing stock that is differently pigmented in some way or other, covering printing inks are fundamentally used, whereby white is likewise added as an eighth printing ink.

The invention shall be explained in greater detail below with reference to FIGS. 1–7. Shown therein are:

DESCRIPTION OF THE PREFERRED EMBODIMENTS

FIG. 1 is a table showing the relationships between the printing inks (fundamental colors) employed in the invention and the extreme chromatic color sensations of the human organ of sight (primary colors);

FIG. 2 is a table showing the various chromatic types in combination with the sensory powers of the human organ of sight;

FIG. 3 is an illustration of the maximum potentials of the color sensations of the human eye;

FIG. 4a is an example of a color nuance which arises due to various color sensation potentials;

FIG. 4b is an illustration of the derivation of the percentage color surfaces of the example of FIG. 4;

FIG. 4c is a planar illustration of the percentage color surfaces in a sub-surface according to the example of FIG. 4a;

FIG. 5a is an example of a different color nuance;

FIG. 5b is an illustration of the derivation of the percentage color surfaces according to the example of FIG. 5a;

FIG. 5c is a planar illustration of the percentage color surfaces in a sub-surface according to the example of FIG. 5a;

FIG. 6 is a division of the picture area into elemental surfaces and sub-surfaces for the inventive printing;

FIGS. 6a–6d are illustrations of individual color separations for the example of FIG. 6;

FIG. 8 is an exemplary circuit for the identification of the color components of the individual sub-surfaces.

Figures 7, 7A:
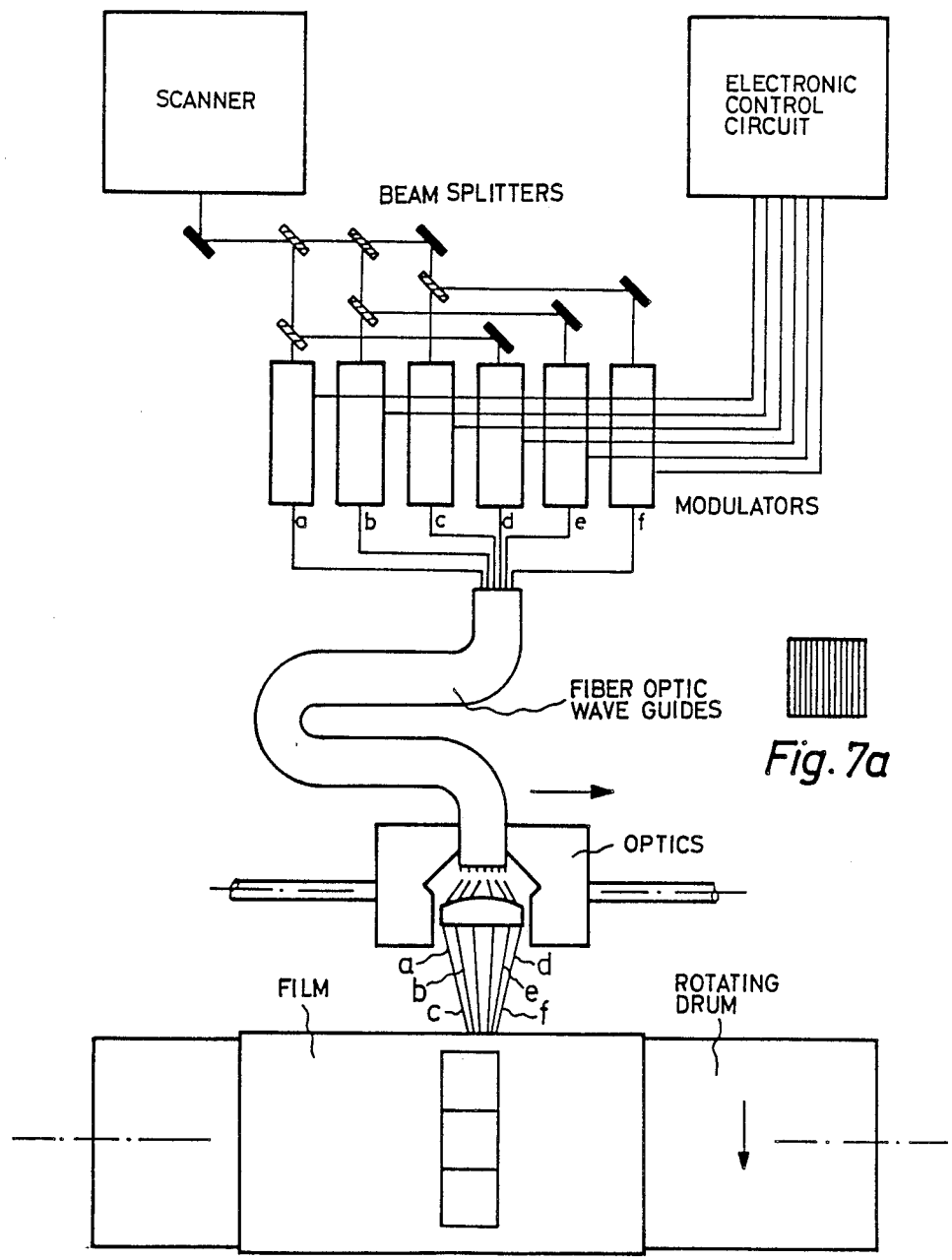
FIG. 7 is an apparatus for the implementation of the method.
FIG. 7a is an example of the recording of an elemental surface with a multiple writing element.

For an understanding of the present invention, the function of the human organ of sight shall be discussed below. The book, *Das Grundgesetz der Farbenlehre* by Harald Küppers, DuMont-Buchverlag, Cologne 1980 which corresponds to US Edition, Basic Law of Color Theory, Barren's Educational Series, Inc. 113 Crossways Park Drive, Woodbury, N.Y. 11797, is referenced in this context.

On the basis of its three types of optical cells (cones) sensitive to different light wavelengths, the organ of sight is capable of perceiving three so-called primary colors, violet-blue, green and orange-red and is capable of perceiving different brightness values due to its rods. The three components of the primary colors correspond to eight fundamental colors, this being shown in FIG. 1 with reference to a Table. The achromatic fundamental colors are white (W) and black (S); the chromatic fundamental colors are yellow (Y), magenta-red (M), cyan-blue (C), violet-blue (V), green (G) and orange-red (O). In the Table of FIG. 1, x's and dashes indicate which of the three colors violet-blue, green and orange-red participate in the corresponding fundamental colors.

FIG. 2 shows the individual combination possibilities, YG, CG, CV, MV, MO and YO, from which it may be seen that the chromatic types respectively derive from two fundamental colors and the achromatic types derive from white and black.

FIG. 3 shows how color sensation can be represented by means of the three components, whereby a system of identification numbers for the three components is introduced such that the respective maximum sensory value is established at 100% and the minimum sensory value is established at 0%. The interaction of the three components, i.e. the respective subset of the corresponding color, yields the resulting color nuance F. As may be seen therefrom, there are just as many color sensations as there are quantitative variation possibilities of the primary colors.

The example of FIG. 4a illustrates how a color nuance $F_4$ arises, this color nuance $F_4$ being composed of the following components:

V = 99%
G = 80%
O = 45%

FIG. 5a shows how a color nuance $F_5$ arises, this color nuance $F_5$ being composed of the following components:

V = 15%
G = 75%
O = 55%

As may be seen from the above, all desired color nuances can be obtained in this fashion.

This principle of so-called integral color mixing is exploited for the printing method of the invention.

The printing method shall be explained in greater detail below with reference to FIGS. 6 and 6a through 6d. FIG. 6 shows an image excerpt or, respectively, an excerpt from a printed product which is constructed of a plurality of elemental surfaces which are filled out with individual sub-surfaces of the eight fundamental colors according to the principle of integrated color mixing. The fields in the left-hand column and the upper field in the center column are a matter of the fundamental colors white, yellow, green and black; the elemental surface in the center is a matter of a side-by-side printing of two fundamental colors yellow and green; and the elemental surface in the lower center is a matter of an achromatic elemental surface which is constructed of corresponding components of white and black. The field at the upper right represents a desaturated pure color (clear color); the field at the center right represents a saturated pure color (dark-clear color); and the field at the lower right represents a color that consists of an achromatic component and of a chromatic component.

The FIGS. 6a and 6d show how, given this example, the individual color separations for the colors white, yellow, green and black are constructed, whereby it can be readily seen that a concomitant printing will again yield the pattern shown in FIG. 6.

In order to explain how the individual sub-color quantities are determined, the examples of FIGS. 4a and 5b shall be referenced again. The color impression, i.e. the color nuance $F_4$, is defined in FIG. 4a by V = 99%, G = 80% and O = 45%. FIG. 4b shows how the individual sub-color quantities of the fundamental colors are determined. In this example, the factor 45 is common to all three primary colors, said factor 45 representing the achromatic component white. This derives by means of comparison with the Table in FIG. 1 in which all three primary colors V, G and O are present in the first line. The color quantity 34% is common to the remaining residual colors V and G, and it derives from the Table of FIG. 1 that the common fundamental color cyan blue is present. Given this color nuance, thus, cyan blue is represented with 35%, this being shown in column 4 of line 4a. Only 19% then still remains for the violet-blue color and 1% remains for the black color, this being negligible.

According to column 3 of FIG. 5b, a common white quantity of 15% derives for the example of FIG. 5b. Green and orange-red have the color quantities 40% in common, this yielding the shared fundamental color yellow according to the Table of FIG. 1. After subtraction of 40% yellow, a color quantity of 20% remains for the color green and a remainder of 25% black color. A color nuance as shown in FIG. 5c and which roughly corresponds to the area 9 in FIG. 6 derives.

FIG. 7 shows an apparatus for recording the color separations as illustrated in the FIGS. 6a through 6d, to which end the recording unit of a laser scanner, for example of the initially cited apparatus CTX 330, or a recording unit such as disclosed in the German Letters Patent No. 21 07 738 which corresponds to U.S. Pat. No. 3,725,574, can, for example, be employed. In the example of FIG. 7, a light beam is split into six sub-beams via a beam splitter which is composed of a system of mirrors and the sub-beams are forwarded to the recording medium via modulators which are individually selected via an electronic control circuit. The output beams of the modulators are directed via fiber-optical cables and an optics onto the recording medium, a film in the present case, which is applied to a rotating drum. Depending upon the point in time at which the modulators are switched on, exposure patterns such as schematically indicated on the film derive. FIG. 7a shows the structure of such sub-surfaces in an enlarged scale. Consider the color separations of FIGS. 6a through 6d. If, for example, one color separation, for example the color separation 6a was to be recorded, then the modulators are switched on only at those locations at which the corresponding white printing ink occurs.

The recording of these sub-surfaces can, of course, also ensue by means of direct color application such as, for example, with a color-capable ink jet printing head, to which end ink jet printers such as specified, for example, in the initially cited German published applications DE-OS No. 32 03 972 which corresponds to U.S. Pat. No. 4,412,225 and DE-OS No. 30 37 774 which corresponds to U.S. Pat. No. 4,367,481 can be employed given suitable selection. When recording with a laser writing unit in accord with FIG. 7, the measured point patterns are previously digitally stored in an advantageous fashion, this being disclosed, for example, in the German Letters Patent No. 21 07 738 which corresponds to U.S. Pat. No. 3,725,574 for individual raster points. According to the present invention, however, the entire color separation as shown in FIGS. 6a through 6d could be stored in a simple fashion, so that the drive of the laser writing unit can ensue from the color separation memories by means of direct readout of the digital information as to whether printing is to be executed or not.

The circuit of FIG. 8 for producing the color separations for the method of the invention is based on a normal color scanner which offers the color components violet-blue, green and orange-red by means of opto-electric conversion via a trichromatic scanning of an original. Such scanners are universally known and are also a component of the initially described color scanners, so that the scan unit is not described specifically in greater detail but the trichromatic color signals supplied by the phototransducer shall form the basis.

The color components violet-blue, green and orange-red are forwarded to analog-to-digital converters 1,2 and 3 to whose output a minimum selection stage 4 is connected. At its output, this stage supplies the smallest of the three color components which is then subtracted from the individual color components in subtractors 5,6 and 7 which are connected to the analog-to-digital converters and to the output of the minimum stage.

The smallest signal that appears at the output of the minimum stage represents the percentage of the white color component that is common to all three components and is written into a color separation memory W via a line 8. The information stored there corresponds to the percentage white level at the appertaining picture location at which the scanner acquired the color components V,G and O.

The outputs of the subtractors 5,6 and 7 are forwarded to limitation stages 9,10 and 11 in which the output signals are limited to 1 in case they are greater than or equal to 1 or are all interpreted with 0 when they are smaller than 1 or are 0. These signals V',G' and O' are forwarded to the input of a table memory 12 for which a truth table which corresponds to an allocation of the primary colors to the six chromatic fundamental colors of FIG. 1 is specified in FIG. 8a. Zero has been substituted for the dashes in FIG. 1 and a binary 1 has been substituted for the x's. One of the chromatic fundamental colors Y,M,C,V,G or O then appears at the output of the table memory dependent on the input combination V'G'O' specified in the table. Which of the six chromatic fundamental colors are contained in the appertaining picture location that is seen by the scanner is identified by means of this procedure. In the example of FIG. 4a, this would be the chromatic fundamental color cyan blue according to the Table in FIG. 4b and, in the example of FIG. 5a, would be the chromatic fundamental color yellow according to the Table 5b.

Connected to the output of the subtractors 5,6 and 7 is a stage 13 which selects the middle signal from the three differential signals. Since, due to the first formation of the difference, one of the signals appearing at the output of the stages 5,6 and 7 is zero, the middle signal is fundamentally the smaller of the two remaining signals, so that the stage 13 is designed as a simple stage for the detection of the smaller signal. This signal represents the percentage of the chromatic fundamental color appearing at the output of the table memory, 35% in the example of FIG. 4a for cyan and 40% in the example of FIG. 5a for yellow.

Further, further subtractors 14,15 and 16, in which the middle differential signal supplied by the stage 13 is subtracted from the differential signals emerging from the stages 5,6 and 7, are connected to the output of the subtractors 5,6 and 7. These subtractors 14,15 and 16 are followed by further limitation stages 17,18 and 19 to which the same condition as for the limitation stages 9,10 and 11 applies, namely that all signals ≧1 are interpreted as 1 and that all signals that are smaller than 1 are interpreted as 0. These signals are likewise forwarded to a table memory 20 which contains the same table as the memory 12. A chromatic fundamental color signal in turn appears at the output of this table memory according to the truth table of FIG. 8a, the color violet being signalled in the case of FIG. 4a and the color green in the case of FIG. 5a. The outputs of the subtractors 14,15 and 16 are connected to a maximum selection stage which indicates the percentage color component of the chromatic fundamental color appearing in the output of the memory 20. The value 19% is valid according to FIG. 4 or, respectively, 4b and, for violet-blue according to FIG. 5 or, respectively, 5b, the blue 20% is valid for green.

Since one color separation is to be produced for every achromatic and very chromatic color of the 6 chromatic colors, one memory is thus provided for each of these color separations, being respectively referenced with the abbreviations for the appertaining colors in FIG. 8. The color separation signals of the six chromatic printing inks are forwarded via switches to the corresponding color separation memories. The outputs of the middle value circuit 13 and of the maximum value circuit 21 are respectively connected for six switches to the six color separation memories for the six chromatic fundamental colors. The actuation of the switches ensues by means of the output signals of the table memories 12 and 20, i.e. when a color appears at the output at the memory 12, then the appertaining percentage value of these colors is forwarded via the switch to the appertaining color separation memory. To this end, six switches, SY,SM,SC,SV,SG and SO, are connected to the output of the stage 13, said six switches being switched on with the appertaining signal output lines Y,M,C,V,G,S of the table memory 12. The output of the maximum stage 21 and the signal lines of the table memory 20 are likewise linked via six such switches, these bearing the same designation in FIG. 8, and the outputs of respectively two identical switches are connected through to the input of the appertaining color separation memory. In order to determine the percentage of the color black, the percentages of the white level, of the middle value and of the maximum value are added and subtracted from 100%. This ensues in a stage 22, which is connected to the outputs of the minimum stage, the middle value stage and the maximum value stage. The output signal of this stage is forwarded to the color separation memory for the color black.

For a scanned picture element which supplies the values V,G and O, thus, a maximum of four color values can be identified, namely white, one of the six chromatic fundamental colors in the table memory 12, one of the six chromatic fundamental colors in the table memory 20 and the color value for the color black. Of course, it is thereby possible, as initially described, that individual values of these values can be zero or any arbitrary value between 0 and 100%. As already initially mentioned, the conversion of these values stored in the color separation signals can ensue by means of an apparatus of the German Letters Patent No. 21 07 738 which corresponds to U.S. Pat. No. 3,725,574 in that elemental surfaces corresponding to the individual percentages are recorded, as has been presented, for example, in the examples of FIGS. 6a through 6d for the picture location shown in FIG. 6, having been again shown separately in detail for the individual color separations. The color separation memories of FIG. 8 supply, for example, the input signals for an address register which can be constructed like the address register 26 shown in FIG. 1 in the German Letters Patent No. 21 07 738 which corresponds to U.S. Pat. No. 3,725,574, whereby the size of the elemental surfaces belonging to the individual percentages are input into memories which correspond to the memory 23 of the German Letters Patent. Since every individual color separation is separately produced in the present invention by means of the laser writing element, the color separation memories of FIG. 8 are successively switched to this address register and, as specified in the German Letters Patent, the laser recording means as is likewise shown again in detail in FIG. 7 of the present patent application is driven by the following memory. The filled color separation memories of FIG. 8 thus replace the scanner unit in the German Letters Patent and likewise supply percentages from 0 through 100 with which the corresponding elemental surface or, respectively, sub-surfaces are recorded at the appertaining picture locations. The actual printing then ensues in that the individual color separations are transferred to the printing stock in succession in various inking apparatus. As proceeds from FIG. 6, the individual sub-surface can be filled out either by one of the eight colors alone or, when it is a matter of an achromatic color nuance, the sub-surface is filled out by elemental surfaces of the two achromatic colors white and black, and, when it is a matter of an exclusively chromatic color nuance, the sub-surfaces are filled out by elemental surfaces of two juxtaposed chromatic fundamental colors; when it is a matter of color nuances in the tertiary domain, then a maximum of four elemental surfaces can come together in one sub-surface, namely elemental surfaces of the achromatic colors white and black on the one hand and of two juxtaposed chromatic printing inks on the other hand.

In comparison to all previously known printing processes, this is a matter of a process technology wherein only one layer of printing ink can at most be present at every location of the printing stock, for the elemental surfaces fundamentally lie side-by-side, this proceeding from FIGS. 6 and 6a through 6d. The following, substantial advantages thereby derive for multi-color printing.

There are fundamentally no ink acceptance problems since at most one ink layer is present at every location of the printing stock.

Since only one ink layer is present at any location of the printing stock, the drying problems are significantly reduced, whereby not only can the dimensioning of the drying systems be smaller rather significantly less energy can be consumed for the drying.

The reproducible color space is significantly expanded by means of utilizing six chromatic printing inks. It is now also possible to produce the purest and most luminous colors in multi-color printing in the color domains violet-blue, green and orange-red. The reason for this is that, differing from conventional printing, the colors do not mutually superimpose over the entire picture surface in the form of picture element structures. A completely moiré-free print image is thereby also enabled. Moreover, work can be carried out in far tighter tolerances than given previous printing processes, since fluctuations of the individual printing inks have a significantly lower influence on the appearance of the print image. It is also possible to arrive at the desired printing result far faster in the printing press, whereby set-up times, i.e. machine hours, and maculature as well can also be saved. Since covering inks can also be used, the color of the printing stock is of no significance for the selection of the printed color picture. Also deriving therefrom is the advantage that high-quality pictures printed multi-color can also be created on inferior printing stock such as, for example, newsprint (for example, for advertisements).

I claim:

1. A reproduction for producing a multi-color printing on printing stock, wherein the multi-color printing is composed of a plurality of elemental areas to which ink is applied comprising the steps of dividing a picture surface into sub-surfaces of identical size, dividing every sub-surface into juxtaposed elemental areas so that each sub-surface has a chromatic component and an achromatic component so that a desired color nuance is obtained at a particular selected sub-surface, the chromatic portion of said sub-surface is further divided into juxtaposed rectangular sub-sections and each of said sub-sections being printed with only one color, printing the sub-sections of said elemental areas which form the chromatic component with a maximum of two of six chromatic printing inks, said inks comprising yellow, orange-red, magenta-red, violet-blue, cyan blue, green and black depending on the chromatic nuance which is to be produced, and printing so that the relative sizes of the white and black elemental areas are varied according to the achromatic component.

2. A method according to claim 1, comprising dividing every sub-surface into a maximum of four elemental areas, of which, two elemental areas forming the chromatic component of the sub-surface, are printed with a maximum of two neighboring printing inks said neighboring inks comprising yellow and orange-red, orange-red and magenta-red, magenta-red and violet-blue, violet-blue and cyan blue, cyan blue and green and green and yellow, and two elemental areas are printed with white and black depending on the achromatic component of the sub-surface to be obtained.

3. A method according to claims 1 or 2 wherein with non-white material to be printed upon, covering printing inks are used.

4. A method according to claims 1 or 2, the size of the sub-surfaces is smaller than the resolution of the standard human eye.

5. A method according to claim 1 or 2 wherein the achromatic component is formed by a white component and a black component and wherein with chromatic material which is to be printed upon the white component of the achromatic component is produced by printing with the color white.

6. A method according to claim 1 or 2 wherein the achromatic component is formed by a white component and a black component and when given white material is to be printed upon, the white component of the achromatic component is obtained by not printing on the printing stock.

7. A method according to claim 1 or 2 wherein the achromatic component is formed by a white component and a black component and when given transparent material is to be printed upon, the white component of the achromatic component is obtained by not printing on the printing stock.

8. A method according to claim 1 or 2 in which when white material is to be printed upon transparent printing ink is used.

9. A method according to claim 1 or 2, which when white material is to be printed upon opaque printing ink is used.

* * * * *